F. DANZENBAKER.
BEEHIVE.
APPLICATION FILED NOV. 30, 1914.
1,154,176. Patented Sept. 21, 1915.
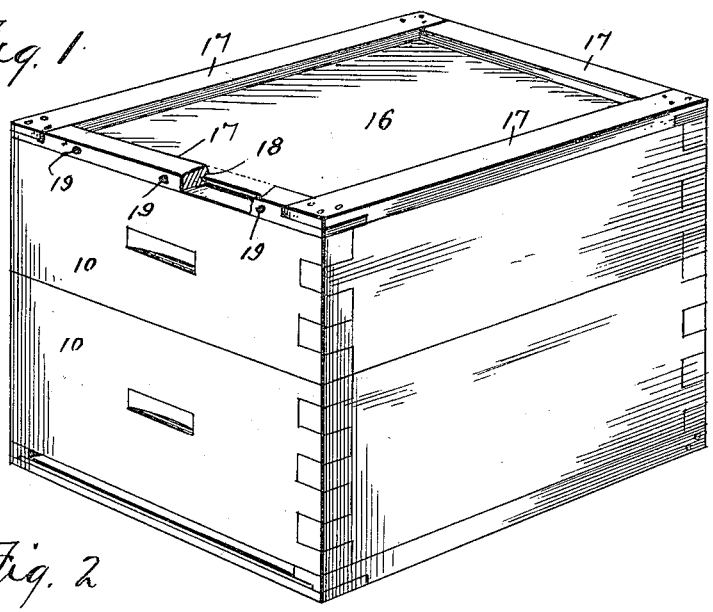
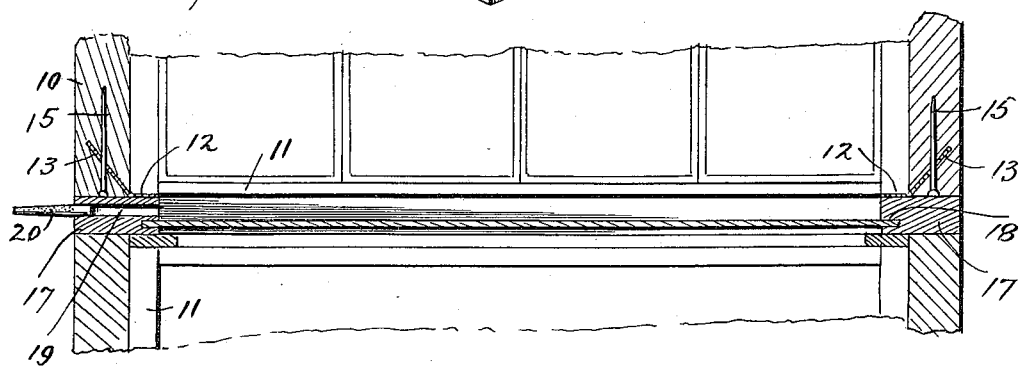
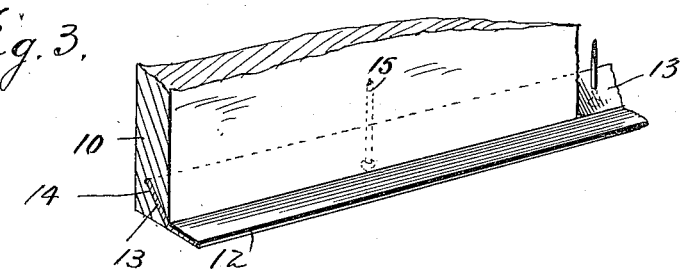
Witnesses
R. B. Jones
A. P. Hayes
Inventor
Francis Danzenbaker
By Chas. J. Williamson
Attorneys

UNITED STATES PATENT OFFICE.

FRANCIS DANZENBAKER, OF NORFOLK, VIRGINIA.

BEEHIVE.

1,154,176.

Specification of Letters Patent. Patented Sept. 21, 1915.

Application filed November 30, 1914. Serial No. 874,747.

*To all whom it may concern:*

Be it known that I, FRANCIS DANZEN-BAKER, of Norfolk, in the county of Norfolk, and in the State of Virginia, have invented a certain new and useful Improvement in Beehives, and do hereby declare that the following is a full, clear, and exact description thereof.

The object of my invention is to improve bee hives in respect of the means for supporting the removable frames used in the brood chamber for supporting brood combs and in the supers for supporting the honey sections, these frames being termed, respectively, brood frames and honey section holders. I have heretofore used ledges, or flanges on the hive walls formed of sheet metal on which said frames rest on their bottoms at the ends and by my present invention I obviate certain difficulties which the use of these have disclosed, and I otherwise render the construction advantageous.

A further object of my invention is the provision of a member capable of performing the functions of a super cover, a bee escape, and a winter cover.

In the accompanying drawings—Figure 1 is a perspective view of a portion of a bee hive illustrating my invention; Fig. 2 is a vertical section thereof; Fig. 3 is a detail view in perspective of my frame support.

In the accompanying drawings, 10 indicates the hive wall which may be a portion of the brood chamber wall, or a portion of the super wall, and 11 designates the frames to be supported which may be brood frames, or section holders. Projecting horizontally inwardly from the hive wall is a flange or ledge 12, formed of a narrow strip of sheet metal having at its inner edge an upwardly and outwardly inclined member 13 that is inserted in an obliquely extending cut or kerf 14 in the hive wall, this cut or kerf in the construction shown extending from the lower inner corner of the wall, for in such construction the supporting ledge 12 is in the plane of the bottom of the hive. At intervals nails 15 are driven horizontally through the wall at points within the vertical limits of the kerf and passing through the upwardly and outwardly inclined member 13. Thus, the hive wall outside of the kerf is made firmly to bind the member 13 and thereby and also by means of the nails the frame-supporting ledge 12 is rigidly secured to the wall. By the oblique cut or kerf in which the member 13 is embedded, it will be seen that the entire vertical inner surface of the hive is of smooth wood, any uneven surfaces, or irregularities in the metal strip above the ledge which otherwise would form projections on the inner side of the hive wall being covered by the wood, and hence, perfectly smooth, or plane surfaces are provided on the inner surface of the hive wall making easy the placing of the frame 11 in position. Again by embedding the upwardly extending ledge member 13 in wood it is protected from rust.

I have a framed member, so constructed that it is capable of performing the functions of a super cover, a bee escape for the removal of bees from the super and the function of a winter cover. Said member consists of a rectangular flat plate 16 of asbestos slate, a material I have found peculiarly suited for beehives, and a frame composed of four similar side bars 17 joined at the corners and each containing on the inner side a groove 18 to receive an edge of the plate. The groove is located much nearer one side of the frame bars than the other so that a shallow space lies between the plane of that side of the plate and the plane of the outer sides of the said bars, the space being a bee-escape while on the opposite side of the plate a space of much greater depth is provided. An important advantage in the use of the frame is that the outside dimensions of the member correspond with the external dimensions of the hive enabling a material saving in the cost of the plate of asbestos slate, for I can thus use a small size that is of standard manufacture, whereas, were I to use a plate without a frame and having the external dimensions of the hive it would require a cut down plate of standard manufacture that would cost more than twice as much. But besides the frame in connection with the plate gives the member the important functional advantages that I have indicated. In making the bee escape one of the end bars of the frame is provided with one or more, preferably three holes 19 that extend horizontally through the bar from the outside to the inside where they communicate with the deeper space within the frame.

When said member is used as a super cover it is placed at the top of the super with the shallow space downward, or immediately above the honey-holding sections. This provides a bee space above the honey sections for the free passage of bees and the gathering of bees in quantity therein thus helping materially to keep up by the animal heat of the bees that degree of temperature in the hive (which is 98 degrees F.) that is necessary. Thus may be assured that temperature which is suitable for working the wax and it assures the filling of the sections in the corners thereof as well as elsewhere and avoids the familiar "popholes" in the corners of the sections which detract from the appearance and value of the comb honey therein. The deeper space in the upper part of the member when used as a super cover can be filled with corrugated paper, or other packing material which also serves the purpose of conserving the heat within the hive and preventing its radiation. The provision of the bee space in the super cover is very important in that it assures the proper room for the bees above the honey section even though shrinkage of the hive sides which may occur diminishes the bee space which is usually provided in the construction of the hive. As is well known, if the distance between the top of the honey sections and the underside of the super cover is less than a bee space, the bees will propolize, or glue the sections to the cover, a proceeding that is objectionable, in that the bees waste time in gathering propolis and applying it, and it soils the cover. Said framed member when used as a winter cover is reversed from the position it occupies when used as a super cover so that the deeper space is below the plate of asbestos slate and affords a large space for the bees to cluster in great quantities as they naturally do in wintering. The shallow space above the top of the place in this case can be filled with corrugated paper, or other packing for heat insulation.

For removing bees from the super the framed member is placed beneath the super with the deeper space upward and thus communication between the hive or brood chamber and the super is cut off and the bees seeing the light through the holes 19 in the frame end bar will pass out therefrom. Each hole has inserted into its outer end a tube 20 of perforated sheet metal, or wire that projects at its free end sufficiently beyond the frame bar so that bees cannot readily find, or enter that end, and hence, cannot pass back into the hive. Any odor, or scent of honey from the super which would attract the bees and cause them to attempt to return would be emitted through the holes in the perforated tube which being close to the front side of the bar would cause the bees to gather upon the bar around the tube at that point so that their efforts to reënter the hive would be made at that point, and, of course, make no attempt to enter the outer end of the tube, a thing in itself of great difficulty by reason of the absence of any supports for the bees. The internal diameter of the holes and tubes is preferably just enough to allow a bee to pass through without ability to turn around, a thing which they sometimes do when the hole is large enough and thereby obstruct the outward passage of other bees. It is a great advantage to remove the bees directly from the super without compelling them to pass from the escape into the brood chamber, because in passing through the brood chamber they have to work their way through clusters of bees and the types of bee escape used for that purpose are subject to being choked by the passing bees with the result that suffocation of bees in the hive takes place. When three holes are provided only two of them may be equipped with the escape tube so that the third is left free for the ingress of bees under conditions making their ingress desirable. Thus a weak colony would be protected because but one ingress opening would exist which a weak colony might readily guard.

Having thus described my invention what I claim is—

1. As an improvement in beehives, the combination of a hive wall, and a frame-supporting ledge consisting of a metal strip that has a portion extending inwardly from the inner surface of the hive wall, and a portion that extends upwardly and outwardly, the wall having a correspondingly inclined cut or kerf to receive such upwardly and outwardly extending portions.

2. As an improvement in bee hives, the combination of a hive wall, and a frame-supporting ledge consisting of a metal strip that has a portion extending inwardly from the inner surface of the hive wall and a portion that extends upwardly and outwardly, the wall having a correspondingly inclined cut or kerf to receive such upwardly and outwardly extending portions, and nails passing into the hive wall at points where they also pass through said upwardly and outwardly inclined portions.

3. A bee hive member comprising a framed flat plate, the frame consisting of bars on all four sides of the plate, a greater space being provided on one side of the plate than on the other, and an end bar being perforated so that communication is provided between such space and the outside of the bar whereby bees may pass between the inside and outside of the hive.

In testimony that I claim the foregoing I have hereunto set my hand.

FRANCIS DANZENBAKER.

Witnesses:
CHARLES J. WILLIAMSON,
A. T. HAYES.